United States Patent
O'Neill et al.

(10) Patent No.: US 8,007,118 B2
(45) Date of Patent: Aug. 30, 2011

(54) DIRECT-LIT BACKLIGHT WITH ANGLE-DEPENDENT BIREFRINGENT DIFFUSER

(75) Inventors: Mark B. O'Neill, Stillwater, MN (US); Carl A. Stover, St. Paul, MN (US); Michael F. Weber, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 471 days.

(21) Appl. No.: 11/843,178

(22) Filed: Aug. 22, 2007

(65) Prior Publication Data
US 2008/0055881 A1 Mar. 6, 2008

Related U.S. Application Data

(60) Provisional application No. 60/824,196, filed on Aug. 31, 2006.

(51) Int. Cl.
*G02B 5/30* (2006.01)
*F21V 9/14* (2006.01)

(52) U.S. Cl. ........ 362/19; 362/97.2; 362/97.3; 362/331; 359/489.06; 359/485.02

(58) Field of Classification Search ............... 362/19, 362/629, 346, 97.1–97.3, 331, 332; 349/112, 349/61–65; 428/1.1; 359/488, 487.05, 487.01, 359/489.06, 485.02
See application file for complete search history.

(56) References Cited

U.S. PATENT DOCUMENTS

| | | | |
|---|---|---|---|
| 5,882,774 A * | 3/1999 | Jonza et al. | 428/212 |
| 6,760,157 B1 | 7/2004 | Allen et al. | |
| 2002/0027626 A1 * | 3/2002 | Hiraishi et al. | 349/112 |
| 2003/0081313 A1 * | 5/2003 | Hiraishi et al. | 359/483 |
| 2003/0117707 A1 * | 6/2003 | Uchida et al. | 359/492 |
| 2004/0265593 A1 * | 12/2004 | Kamijo et al. | 428/411.1 |
| 2005/0068759 A1 | 3/2005 | Takemoto et al. | |
| 2006/0007371 A1 | 1/2006 | Miyatake et al. | |

FOREIGN PATENT DOCUMENTS

| | | |
|---|---|---|
| WO | WO 97/32223 | 9/1997 |
| WO | WO 97/32226 | 9/1997 |
| WO | WO 01/90637 | 11/2001 |

* cited by examiner

*Primary Examiner* — Thomas M Sember
(74) *Attorney, Agent, or Firm* — Robert S. Moshrefzaden

(57) ABSTRACT

A direct-lit backlight includes a diffuse reflector disposed in front of a light source. The diffuse reflector has a continuous phase material and a disperse phase material, at least one of which is birefringent, and the disperse phase material is formed into particles having a transverse dimension less than 1 micrometer for efficient visible light scattering. The continuous and disperse phases have refractive indices tailored so the diffuse reflector transmits light from the light source substantially more strongly for obliquely incident light than for normally incident light to provide bulb-hiding characteristics.

21 Claims, 2 Drawing Sheets

DIRECT-LIT BACKLIGHT WITH ANGLE-DEPENDENT BIREFRINGENT DIFFUSER

CROSS REFERENCE TO RELATED APPLICATION

This application claims the benefit of U.S. Provisional Patent Application No. 60/824,196, filed Aug. 31, 2006, the disclosure of which is incorporated by reference herein in its entirety.

FIELD OF THE INVENTION

The present invention relates to extended area light sources, particularly those suitable for use as backlights for liquid crystal (LC) panels, signs, and the like.

BACKGROUND

Recent years have seen tremendous growth in the number and variety of display devices available to the public. Computers (whether desktop, laptop, or notebook), personal digital assistants (PDAs), mobile phones, MP3 music players, and thin LCD TVs are but a few examples. Although some of these devices can use ordinary ambient light to view the display, most include a backlight to make the display visible.

Many such backlights fall into the categories of "edge-lit" or "direct-lit". These categories differ in the placement of the light sources relative to the output area or face of the backlight, where the output face defines the viewable area of the display device. In edge-lit backlights, a light source is disposed along an outer border of the backlight construction, outside the area or zone corresponding to the output face. The light source typically emits light into a light guide, which has length and width dimensions on the order of the output face and from which light is extracted to illuminate the output face. In direct-lit backlights, an array of light sources is disposed directly behind the output face, and a diffuser is placed in front of the light sources to provide a more uniform light output. Some direct-lit backlights also incorporate an edge-mounted light, and are thus capable of both direct-lit and edge-lit operation.

One example of a direct-lit display is shown in FIG. 1, which illustrates in a schematic sectional exploded view selected optical components of a liquid crystal display television (LCD TV) 10, commercially available from Samsung Corp. as model LTN226W. This figure is not to scale, and some of the features are exaggerated for ease of illustration. The LCD TV 10 has a 22-inch screen size and a 16:9 aspect ratio, meaning the screen is about 10.8 inches (275 mm) in height and 19.2 inches (485 mm) in width. In this regard, height, width, and depth correspond to the Cartesian x-, y-, and z-axes respectively shown in the figure. The LCD TV 10 has an LCD panel 12 viewable by the observer 13, and a collection of components forming a backlight 14 behind the LCD panel 12.

In the backlight 14, light is generated by an array of eight CCFL sources 16, each of which spans the width of the TV screen and which have a uniform center-to-center spacing S of about 33.8 mm. The sources have a circular cross-sectional shape about 3 mm in diameter (diameter=2 R). They are disposed between a patterned diffuser plate 18 and a back reflector 20. The diffuser plate 18 transmits light but with a substantial amount of scattering to provide light diffusing characteristics. The diffuser plate also has on its back surface a printed dot pattern, which pattern is in registration with the light sources 16. That is, the printed dot pattern is more dense at locations directly above the light sources 16 and less dense at locations between neighboring light sources. Thus, the diffuser plate 18 is highly non-uniform over its useful area. The back reflector 20 is an opaque white film or paint coated onto a stiff metal substrate. The setback distance D from the diffuser plate 18 to the sources 16, measured from the back surface of the diffuser plate to the center of the sources, is about 11.1 mm, and the distance T from the sources 16 to the back reflector 20 (measured from the center of the sources to the front surface of the back reflector) is about 5.6 mm. The overall gap dimension G from the diffuser plate 18 to the back reflector, which is measured from the back surface of the diffuser plate to the front surface of the back reflector, and which satisfies G=D+T, is about 16.7 mm. Atop the diffuser plate 18 is a film stack consisting of: a beaded diffuser film 22 with an outer beaded layer facing the front of the backlight/display as shown; a prismatic brightness enhancement film 24 (Vikuiti™ Brightness Enhancement Film-III-Transparent (BEFIII-T), available from 3M Company) oriented as shown, with prisms facing the front of the backlight/display; and a reflective polarizer 26 (Vikuiti™ Dual Brightness Enhancement Film-Diffuse 440 (DBEF-D440), available from 3M Company). The reflective polarizer 26 can be considered to form the outermost film or layer of the backlight 14.

The backlight 14 illuminates LCD panel 12, which comprises an electronically addressable liquid crystal array sandwiched between glass plates. The panel 12 also includes a front and back absorbing polarizer, and a color filter matrix.

Rather than requiring a spatially non-uniform diffuser plate that must be in registration with the light sources in order to achieve the required illumination uniformity over the useful area of the backlight, it would be desirable to use an alternative technique that does not require spatial nonuniformities to provide the bulb-hiding function.

BRIEF SUMMARY

The present application discloses, inter alia, direct-lit backlights that include a diffuse reflector disposed in front of a light source. The diffuse reflector has a continuous phase material and a disperse phase material, at least one of which is birefringent, and the disperse phase material is preferably formed into particles having a transverse dimension less than 1 micrometer for efficient scattering of visible light. The continuous and disperse phases preferably have refractive indices tailored so that the diffuse reflector transmits light from the light source substantially more strongly for obliquely incident light than for normally incident light. The percent transmission of the diffuse reflector for the obliquely incident light differs from the percent transmission of the diffuse reflector for normally incident light by an amount $\Delta T$ that preferably exceeds the combined reflectivity due to normal-incidence surface reflections from opposed major surfaces of the diffuse reflector. Stated differently, the increased transmission $\Delta T$ at oblique incidence (relative to normal incidence) is greater than any corresponding reduction in reflectivity of the opposed major surfaces of the diffuse reflector. This angle-dependent transmissivity gives the diffuse reflector a significant bulb-hiding function without the need for spatial nonuniformities, or precise registration of such nonuniformities with the light source(s).

If one considers light propagating through the diffuse reflector at angles that deviate more and more from normal incidence, i.e., light propagating at more and more oblique angles, such light has a longer and longer optical path in traversing the thickness of the diffuse reflector, from one major surface thereof to the opposite major surface. For reflectors having a continuous/disperse phase construction, this means that such light will encounter more and more interfaces between the continuous and disperse phases, leading to increased diffuse reflectivity and decreased transmissivity with increasing angle. To offset this effect, the refractive indices of the continuous and disperse phases exhibit a relative refractive index mismatch $\Delta nx$ along an x-direction and a relative refractive index mismatch $\Delta nz$ along a z-direction normal to the x-direction, $\Delta nz$ being sufficiently smaller in magnitude than $\Delta nx$ to provide the substantial bulb-hiding function. The x-direction is parallel to the plane (e.g. even a localized portion) of the diffuse reflector, and the z-direction is perpendicular or normal to such plane. The refractive index mismatch $\Delta nz$ is smaller than $\Delta nx$ by an amount sufficient to overcome the effects of increasing path length with angle, and any other effects that tend to decrease transmission with increasing incidence angle. Preferably, light that is incident in the x-z plane and whose polarization direction lies in the x-z plane is strongly reflected and weakly transmitted when incident normally on the diffuse reflector, and more weakly reflected and more strongly transmitted at increasingly oblique angles of incidence. Although suitable refractive index relationships will depend on the details of construction of the diffuse reflector, such as the overall film thickness, volume fraction of disperse phase, particle size distribution of the disperse phase, and so on, in some embodiments the magnitude of $\Delta nx$ is at least 0.1, more preferably 0.15 or 0.2 or more, and the magnitude of $\Delta nz$ is less than 0.03, or 0.02, or 0.01, preferably being about 0.

A light redirecting element such as a secondary diffuser or microstructured turning film can be provided in front of the diffuse reflector so that much of the light exiting the diffuse reflector at high propagation angles can be forward scattered toward directions closer to the viewing axis of the backlight.

Further, a back reflector is preferably disposed behind the light source so that light reflected by the diffuse reflector can be converted to a polarization and/or a direction that will be transmitted by the diffuse reflector, thus improving backlight efficiency by a recycling mechanism. The back reflector may reflect light specularly or diffusely, or a combination thereof.

The angle-dependent diffuse reflector can be a diffuse polarizer, wherein normally incident light of orthogonal polarization states have substantially different reflection and/or transmission properties, or a diffuse mirror, wherein such light does not have substantially different reflection and/or transmission properties. If a polarizer, then a refractive index mismatch $\Delta ny$ between the continuous and disperse phases along an in-plane y-direction perpendicular to the x- and z-directions can be small relative to $\Delta nx$, e.g. about equal to $\Delta nz$, such that light of any incident direction whose polarization direction is parallel to the y-z plane is weakly reflected and strongly transmitted. In such case the backlight may include a second polarizer, preferably a reflective polarizer, disposed proximate the angle-dependent diffuse polarizer and oriented to reflect or otherwise block the polarization state strongly transmitted by the angle-dependent diffuse polarizer. I.e., the second polarizer and the angle-dependent diffuse polarizer have respective (normal incidence) pass axes and block axes, and the block axis of the second polarizer is substantially aligned with the pass axis (in this case the y-axis) of the angle-dependent diffuse polarizer. This relative orientation preferably blocks light polarized along the pass axis of the diffuse reflective polarizer, preventing such light from directly exiting the backlight. Such light can be reflected by the second polarizer back towards the light source and at least partially converted to an orthogonal polarization state by the back reflector. The orthogonally polarized light may then pass through the second polarizer, and may also pass through the angle-dependent diffuse reflective polarizer depending on the incidence angle of such light on the diffuse reflective polarizer.

The diffuse reflective polarizer desirably exhibits a relatively low transmission, e.g., less than 50%, or 25%, or 10% or less, of normally incident light whose linear polarization state is parallel to the block axis of the diffuse reflective polarizer. However, as the incidence angle increases from normal incidence, and provided the incident direction lies in a plane that contains the block axis and the original normal direction, the transmissivity of the diffuse reflective polarizer increases for linearly polarized light whose electric field vector lies in the plane of incidence, referred to as p-polarized light. Thus, the diffuse reflective polarizer possesses a polarization-sensitive bulb-hiding property, where light of a particular polarization state is predominantly reflected or otherwise scattered at near-normal incidence angles (e.g. when viewed directly above the light source) but increasingly transmitted at increasing incidence angles. This is accomplished by appropriate selection of the relative refractive indices of the continuous and disperse phase materials used in the diffuse reflective polarizer as discussed above.

If the angle-dependent diffuse reflector is more representative of a mirror, then the refractive index mismatch $\Delta ny$ between the continuous and disperse phases along the in-plane y-direction can be on the order of $\Delta nx$, or even greater. Then, reflection and transmission characteristics in the y-z plane may be the same as or similar to such characteristics in the x-z plane. Light that is incident in the y-z plane and whose polarization direction lies in the y-z plane is strongly reflected and weakly transmitted when incident normally on the diffuse reflector, and more weakly reflected and more strongly transmitted at increasingly oblique angles of incidence.

Like the angle-dependent diffuse reflective polarizer discussed above, the diffuse reflective mirror possesses a polarization-sensitive bulb-hiding property, but for the mirror light of any polarization state is predominantly reflected or otherwise scattered at near-normal incidence angles (e.g. when viewed directly above the light source). At higher incidence angles, the diffuse reflective mirror increasingly transmits p-polarized light, where p-polarized light is understood as linearly polarized light whose electric field vector oscillates in the plane of incidence. In contrast, the orthogonal s-polarized light is generally reflected or scattered more as the incidence angle increases. Using a suitable back reflector, such reflected light can be at least partially converted to high-incident angle p-polarized light which can then be transmitted by the diffuse reflective mirror for enhanced system efficiency. The angle- and polarization-dependent transmission properties of the diffuse mirror are accomplished by appropriate selection of the relative refractive indices of the continuous and disperse phase materials, as discussed above.

Curiously, the angle-dependent reflectivity of p-polarized light for the disclosed diffuse reflectors (whether polarizer or mirror) are significantly different than their multilayered counterparts e.g. as disclosed in U.S. Pat. No. 5,882,774 (Jonza et al.), the latter of which have the same refractive index relationships but with a flat, extended multilayer geometry rather than a continuous/disperse phase geometry.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF ILLUSTRATIVE EMBODIMENTS

Figure 1:
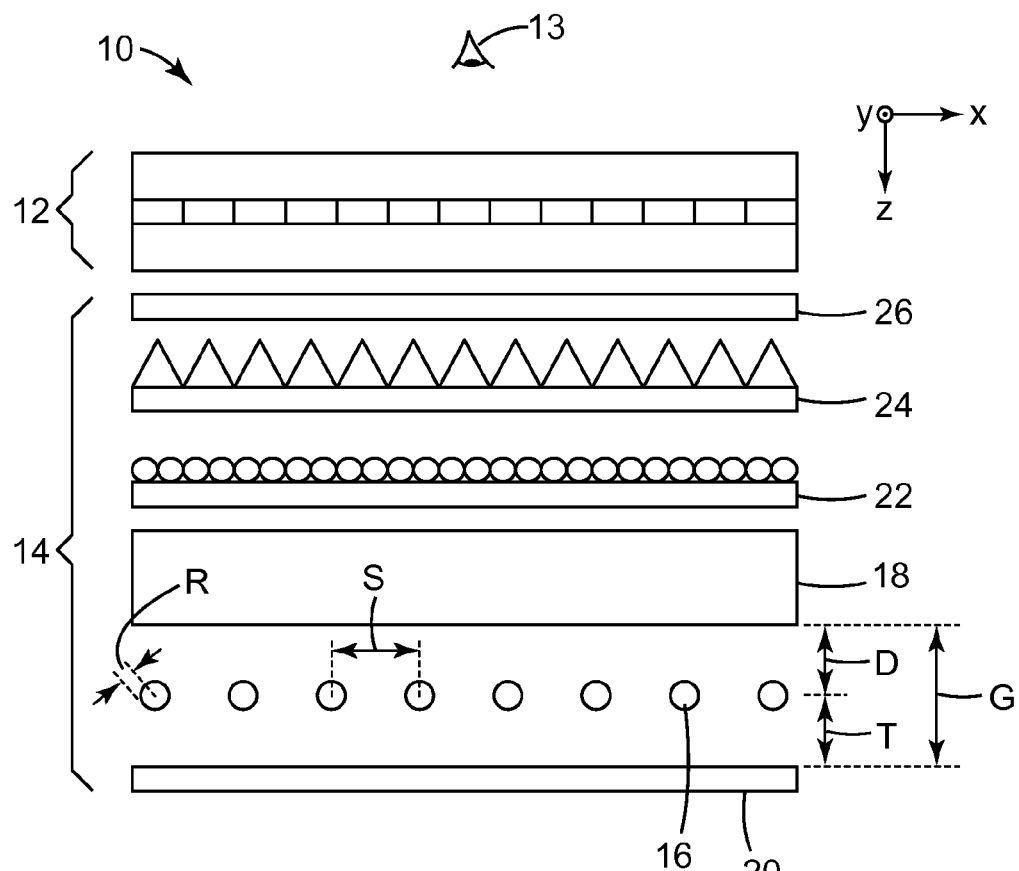
FIG. 1 is a schematic sectional exploded view of the optical components of a commercially available LCD-TV, which includes a direct-lit backlight having a diffusely reflective back reflector.
Figure 2:
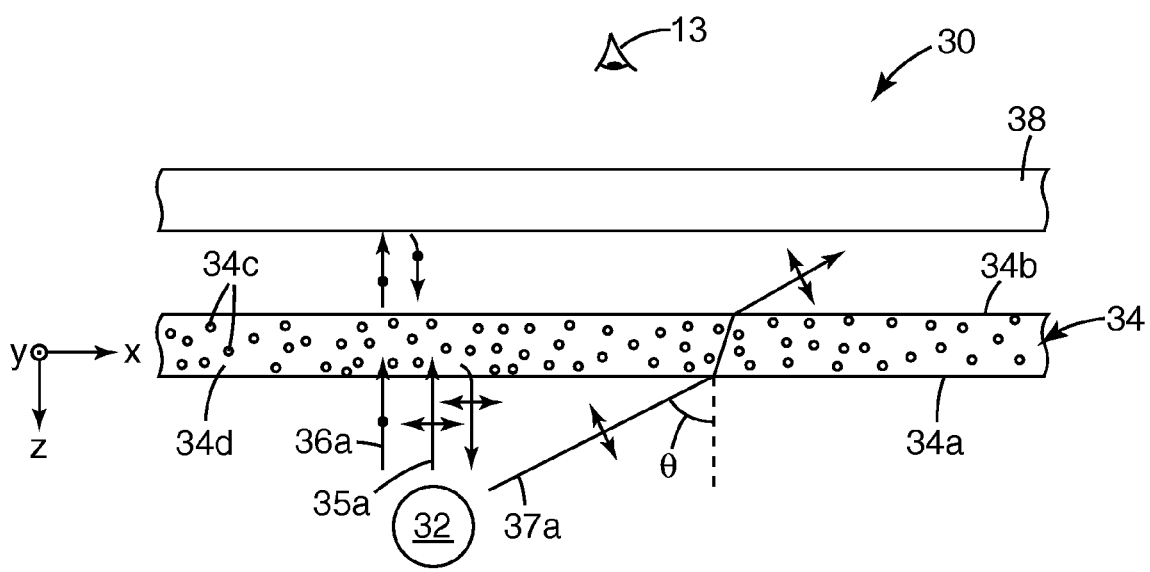
FIG. 2 is a schematic side view of a direct-lit backlight including a diffuse reflector having a continuous/disperse phase construction.

FIG. 2 shows a schematic side view of a portion of a direct-lit backlight 30. The backlight includes a light source 32 and a diffuse reflector 34 that has unique angle-dependent reflectivity properties, and an optional polarizer 38. The backlight is shown in relation to a Cartesian x-y-z coordinate system, where the z-axis is parallel to a viewing axis of the backlight, and the output face or area of the backlight extends along the x- and y-directions.

The light source can be an extended diffuse source such as a cold cathode fluorescent lamp (CCFL), or a smaller area solid state source such as an LED. The light source 32 may also be one of an array of such sources. If it is an array of LEDs, each LED may emit white light, or groups of LEDs may emit different visible colors, which when combined temporally and spatially produce the appearance of white light. The LED(s) may be forward emitters or side emitters, or a combination thereof. To some extent, however, the source 32 typically emits light both in a forward direction, i.e., along the viewing axis of the backlight, and in sideways or oblique directions, as shown. The angle θ, measured from the viewing axis of the backlight or from the normal axis of the reflector 34, provides a measure of the direction of the light ray. In FIG. 2 the propagation or incidence angle θ is measured in air. After the light has entered the diffuse reflector 34, the propagation direction of light within the diffuse reflector can be characterized by an internal angle of propagation $\theta_{int}$, where $\theta_{int}$ is also measured with respect to the viewing axis of the backlight or the normal axis of the reflector. In the case of FIG. 2, $\theta_{int}$ is related to θ by the laws of refraction at a first major surface 34a of the reflector 34.

The diffuse reflector 34 has opposed major surfaces 34a, 34b and a physical thickness therebetween measured along the z-axis. The major surfaces may both be exposed to air, or one or both may be exposed to another material such as by lamination to a plate or film. The reflector 34 provides reflectivity as a result of a continuous/disperse phase construction, where microscopic particles 34c of a disperse phase material are dispersed or embedded in a continuous or substantially continuous phase material 34d. In exemplary embodiments, the disperse phase material and the continuous phase material are both polymers, but other materials may also be used. Reference is made to U.S. Pat. No. 6,760,157 (Allen et al.). For optimal scattering properties, the particles of the disperse phase are on the order of the size of the wavelength of light of interest, or smaller. For example, since backlights are normally intended for human viewing at visible wavelengths, the particles preferably have (on average) a transverse dimension less than 1 micrometer, more preferably less than 0.5 or 0.1 micrometer.

The diffuse reflector 34 of FIG. 2 is a diffuse reflective polarizer. Thus, the continuous and disperse phase materials have been selected, and the film has been processed in such a way (e.g. by an unconstrained uniaxial stretch at an appropriate temperature) that the refractive index mismatch Δnx between the continuous and disperse phases along the x-axis is large, while the refractive index mismatch Δny between the continuous and disperse phases along the y-axis is small or zero. Significantly, the refractive index mismatch Δnz between the continuous and disperse phases along the z-axis is also controlled to be zero or small relative to Δnx as described above.

Figure 2A:
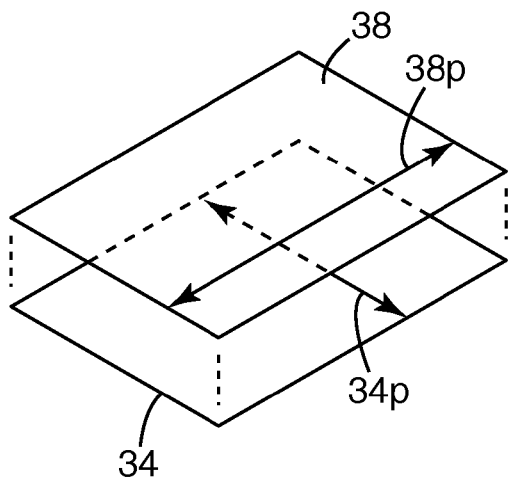
FIG. 2a is a schematic top or front view of the backlight of FIG. 2 in which the diffuse reflector is a polarizer, the view of FIG. 2a showing the relative orientation of the diffuse reflective polarizer and a second polarizer.

In order to demonstrate the functionality of the backlight, we see in the figure light rays 35a, 36a incident normally on the diffuse reflector (or reflective polarizer) 34. Light ray 35a is linearly polarized in the x-z plane, and light ray 36a is linearly polarized in the y-z plane. Ray 36a is substantially transmitted by the reflector 34, since it encounters virtually no refractive index difference between the continuous and disperse phases. Note that the relatively small reflections at the air/polymer interfaces corresponding to the two major surfaces 34a, 34b, are not shown in the figure for simplicity. Ray 35a is substantially reflected by the reflector 34, since it encounters a relatively large refractive index difference between the continuous and disperse phases, and the concentration of disperse phase particles (or volume percent of disperse phase material) and the thickness of the reflector 34 are suitably selected to provide substantial reflection. Thus, even if light source 32 emits unpolarized light, a substantial portion of such light that is directed along the viewing axis of the backlight is reflected or blocked by diffuse reflector 34, providing at least some bulb-hiding. Further bulb hiding can be achieved by placing another polarizer 38, preferably a low loss reflective polarizer such as those described in U.S. Pat. No. 5,882,774 (Jonza et al.), atop or otherwise in front of the diffuse reflector 34, making sure to orient the second polarizer 38 substantially orthogonally with respect to the diffuse reflector 34 such that the polarization state that is best transmitted by the diffuse reflector 34 at normal incidence is substantially reflected by the second polarizer 38. This is best shown in the exploded view of FIG. 2a, where polarizer 38 has a normal incidence pass axis 38p and diffuse reflector 34 has a normal incidence pass axis 34p, and polarizer 38 is rotated or oriented such that pass axis 38p is substantially orthogonal to pass axis 34p (and thus a block axis of polarizer 38 is substantially aligned with pass axis 34p). The combination of the diffuse reflector 34 and second polarizer 38 can block a large portion of forward propagating light from the light source 32 for very effective bulb hiding. Note that the second polarizer 38 may also be positioned behind the diffuse reflector 34, between the diffuse reflector and the light source 32. Regardless of the position of the second polarizer, both it and the diffuse reflector 34 preferably extend in both length and width (the x- and y-directions) to substantially fill the output area of the backlight. Thus, the second polarizer and the diffuse reflector 34 are preferably substantially co-extensive in length and width. Further, the diffuse reflector 34 and the second polarizer 38 can be laminated together, whether directly or through one or more intermediate films or substrates, for ease of handling.

FIG. 2 also shows an obliquely propagating light ray 37a, incident on the major surface 34a of diffuse reflector 34 at angle θ. Ray 37a is polarized in the x-z plane, similar to ray 35a, but since the x-z plane is also the plane of incidence for ray 37a, ray 37a is p-polarized with respect to the diffuse reflector 34. This p-polarized light has a component of its electric field vector parallel to the z-axis, and this component increases with increasing angles θ and $\theta_{int}$. We have found that it is possible to process the diffuse reflector in such a way that a substantial increase in transmission of p-polarized light can be observed for the obliquely incident light relative to normally incident light of the "same" polarization state (i.e., linearly polarized in the same plane, since normally incident light is typically not considered to be either s- or p-polarized). In this regard, "substantial increase in transmission" refers to a difference in transmission ΔT, between the oblique ray and the normal ray of the same polarization state, that is greater than the reflectivity at normal incidence due to the surface reflections at both major surfaces 34a, 34b. Stated differently, "substantial increase in transmission" refers to a difference in transmission ΔT that cannot be attributed to the reduction in or absence of surface reflections at the major surfaces 34a, 34b for the oblique ray. Such reduction or absence of surface reflections may, for example, be due to the fact that the oblique ray is incident at an angle θ equal to or close to the Brewster angle of the diffuse reflector 34. The processing conditions for achieving this increase in transmission are believed to produce a very small refractive index difference Δnz between the continuous and disperse phases. Thus, as the p-polarized ray propagates more and more obliquely through the body of the diffuse reflector, it encounters less and less of an index difference between the continuous phase and disperse phase, and this effect overcomes competing effects due to increased path length. Preferably, the increase in transmission is at least 10% or at least 20% for an angle θ (in air) of 60 degrees, relative to normal incidence (θ=0).

Interestingly, the reader will recall that U.S. Pat. No. 5,882,774 (Jonza et al.) teaches, among other things, that controlling the out-of-plane refractive index difference (Δnz) between layers in a multilayer stack to be zero produces an interfacial reflectivity that is constant with increasing incidence angle. This can be contrasted to a film reflectivity that decreases with increasing incidence angle as we have demonstrated with continuous/disperse phase media.

Returning now to FIG. 2, the oblique ray 37a is seen to be more strongly transmitted by the diffuse reflector 34. This is so even though this ray is polarized in a plane that is parallel to the x-axis, which would normally be considered the block axis of the reflector 34. After exiting the reflector 34, the ray encounters the second polarizer 38, but because of the relative orientation shown in FIG. 2a, the ray's polarization aligns with the pass axis of the second polarizer and proceeds out of the backlight in the general direction of the viewer.

The reader will understand that an oblique ray similar to ray 37a but having a polarization state like that of ray 36a, where the electric field vector of the light oscillates parallel to the y-axis, will be substantially transmitted by diffuse reflector 34 and substantially reflected or otherwise blocked by second polarizer 38.

The bulb hiding capability of the angle-dependent diffuse reflector is related to the fact that it provides substantially increased transmission of light for obliquely propagating light rays compared to normally incident light rays. Advantageously, this characteristic of the diffuse reflector is not dependent on any (macroscopic) spatial non-uniformity which would require registering a particular portion of the diffuse reflector with the light source(s). Although the concentration of disperse phase material may be tailored to be higher in some macroscopic areas or zones than others, preferably the disperse phase material is dispersed substantially uniformly (in the form of microscopic particles embedded in continuous phase material) throughout the diffuse reflector.

The bulb hiding capability is also related to the fact that the light source(s) are preferably spaced apart from the diffuse reflector by a gap or other distance that is large enough so that the oblique light rays can travel laterally a sufficient amount to avoid emerging from the diffuse reflector at a point directly above or directly adjacent the light source from which it is emitted. For example, a gap of at least about the minimum lateral dimension of the light source may be used. In the case of a CCFL source, the minimum lateral dimension refers to the width of the lamp, not the length.

The backlight 30 can include additional optical components for improved operation. For example, a conventional diffuser film can be placed atop or in front of the second polarizer 38 (between polarizer 38 and observer 13) so that the predominantly obliquely propagating light exiting the second polarizer 38 is at least partially redirected towards the viewing axis of the backlight. Alternatively or additionally, a brightness enhancement film (BEF) such as any of those sold by 3M Company under the Vikuiti™ brand, or conventional prismatic turning films, for example, those sold by Mitsubishi Rayon Company, may be used to redirect obliquely propagating light rays towards the viewing axis. In this regard, the angle-dependent diffuse reflector can be combined with BEF or turning film to increase the brightness, also referred to as the "gain", of the backlight or display. Also, a back reflector can be placed below or behind the light source 32, so that light reflected by reflector 34 or polarizer 38 can be redirected by the back reflector in a direction and with a polarization that can exit the backlight, thus enhancing overall backlight efficiency and brightness. The back reflector may be specularly reflective or diffusely reflective. It may also be desirable to make use of internal propagation angles $\theta_{int}$ in the diffuse reflector that are super-critical, i.e., that are more oblique than could be obtained by directing grazing incidence light (θ=90 degrees) in an air medium at flat major surfaces of the diffuse reflector. Such super-critical propagation angles can be obtained by making one or both major surfaces non-flat, e.g. by imposing a faceted structure on them or by laminating a faceted film to one or both flat major surfaces. Exemplary faceted films include but are not limited to Vikuiti™ brand BEF products available from 3M Company, and prismatic cube corner films. If the light source 32 is elongated such as a conventional CCFL source or a row of LED sources, a linear prismatic film can be used, and the axes of the prisms can be arranged to be substantially parallel to the major axis of the elongated source.

Figure 3:
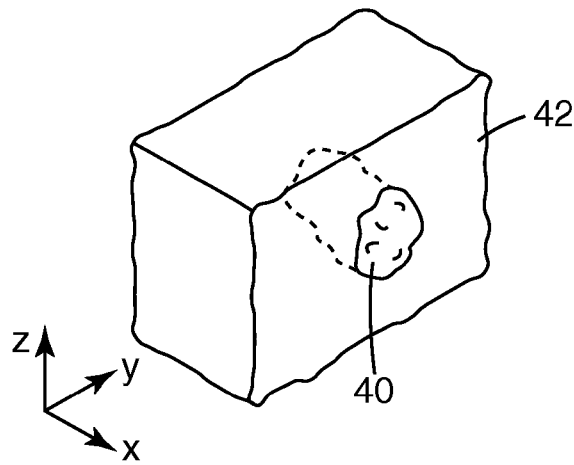
FIG. 3 is a schematic perspective view of a particle of disperse phase material embedded in a continuous phase material.

FIG. 3 is a schematic perspective view of a small portion of a diffuse reflector having the unique angle-dependent properties, showing a single particle 40 of disperse phase material embedded in a continuous phase material 42. In the case of an exemplary polarizer, the particle 40 may have an isotropic refractive index of, for example, 1.57, and the continuous phase material 42 may have refractive indices nx=1.85, ny=1.57, and nz=1.57. Such indices are achievable using SA-115, a copolymer of polycarbonate and PCTG available from Eastman Chemicals, for the discontinuous phase material, polyethylene naphthalate (PEN) for the continuous phase material, and orienting the cast film along the x-axis in an unconstrained manner for a true uniaxial orientation along the x-axis. In the case of an exemplary mirror, the particle 40 may have an isotropic refractive index of, for example, 1.49, and the continuous phase material 42 may have refractive indices nx=1.75, ny=1.75, and nz=1.49. Such indices are achievable using polymethylmethacrylate (PMMA) for the discontinuous phase material, PEN for the continuous phase material, and orienting the cast film along the x- and y-axes substantially equally under suitable conditions. Other suitable materials for the continuous phase are polyethylene terephthalate (PET), and copolymers of PEN and PET. PEN and PET can be biaxially oriented such that the out-of-plane refractive index, nz, is approximately 1.49. PMMA and other acrylate materials can then be used to provide a match to nz of the either material. The coPENs have slightly higher values of nz, in the range of 1.50 to 1.54, which can be matched with various copolyesters or inorganic materials such as glass beads. In general, whether the diffuse reflector is more characteristic of a polarizer or a mirror, it can be made with any suitable materials and processed to yield refractive indices that produce the desirable bulb-hiding properties discussed above. In many cases it is desirable for the disperse phase material to maintain an isotropic refractive index and the continuous phase material to be birefringent, whether uniaxially birefringent (e.g. nx=ny≠nz) or biaxially birefringent (where no two of nx, ny, nz are the same), but counterexamples are also possible. At least one of the continuous phase and disperse phase material should be birefringent. If both materials are birefringent then preferably one is a positive and the other is a negative birefringent material. The materials can be chosen and processed so that $nz_1-nz_2$ is small in magnitude compared to an in-plane refractive index differential.

The shape of the particles of the disperse phase material is not critical, as long as the average transverse dimension is on the order of or small compared to the wavelength of light of interest, as discussed above. In some cases the particles may be approximately spherical, or they may be elongated, typically along one or two in-plane directions. For example, if the diffuse reflector has been uniaxially stretched to orient the materials to form a polarizer, the particles may be cigar-shaped and elongated parallel to the stretch direction. The disperse phase material may also be in the form of fibers aligned parallel to each other and embedded in the continuous phase material, where each fiber may span the entire length or width of the disperse reflector. Such fibers may be isotropic or birefringent. If birefringent, they are typically uniaxially birefringent, with one refractive index associated with light polarized along the length of the fiber and a different refractive index associated with light polarized along any transverse direction of the fiber. In cases where the diffuse reflector has been biaxially stretched to orient the materials to form a mirror, the particles may be saucer-shaped, with the saucers being oriented parallel to the plane of the mirror.

Figure 4:
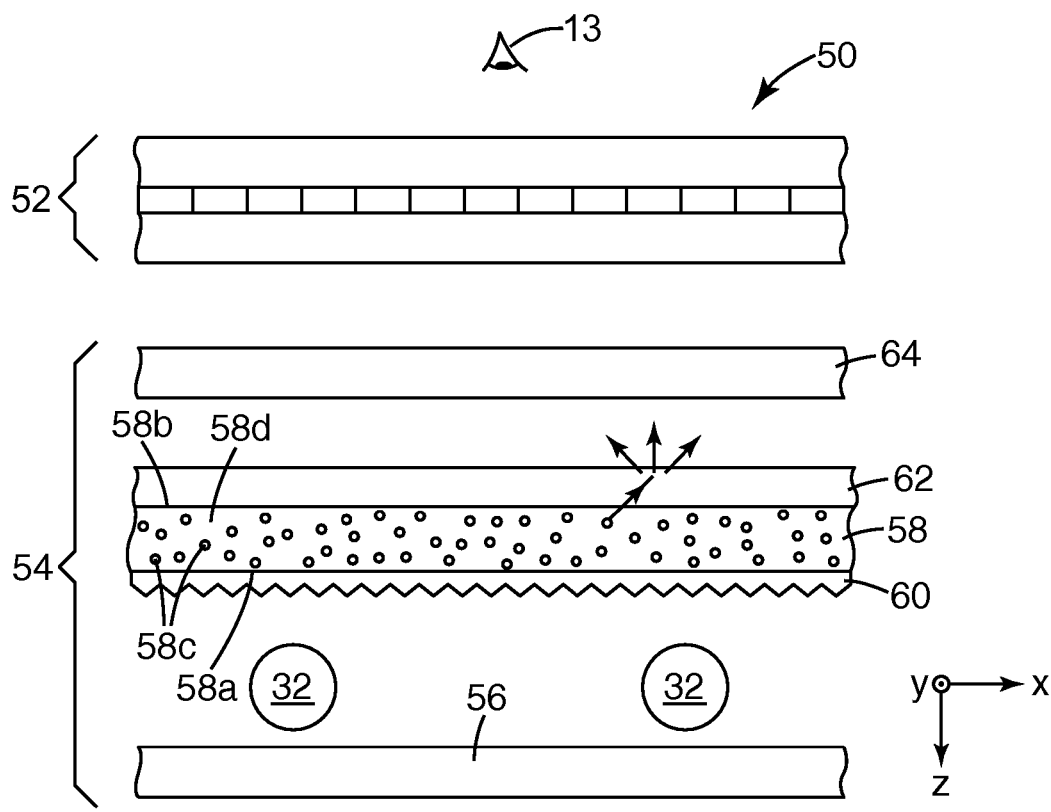
FIG. 4 is a schematic side view of a direct-lit display that includes a continuous/disperse phase diffuse reflector as disclosed herein.

Turning our attention now to FIG. 4, we see there a schematic side view of a direct-lit display 50 that includes a continuous/disperse phase diffuse reflector having the desirable angle-dependent reflection and transmission properties. The display 50 is composed generally of a liquid crystal display panel 52, and a direct-lit backlight 54. The display panel includes liquid crystal cells that form picture elements (pixels) for the display, the liquid crystal material being sealed between two glass window members or panels. The display panel may also include a front absorbing polarizer and a rear polarizer, not shown.

The backlight can include two or more light sources 32 as described above. Beneath or behind the light sources is a back reflector 56, also as described above.

In front of or above the light sources is a diffuse reflector 58 having the desirable angle-dependent properties. In the case of display 50, reflector 58 is chosen to be a mirror-type reflector. Thus, light from the light source 32 that strikes the reflector 58 at normal incidence is substantially reflected, regardless of its polarization state. The reflector 58 has first and second major surfaces 58a, 58b, between which microscopic particles 58c of a disperse phase material are dispersed or embedded in a continuous or substantially continuous phase material 58d. The difference in refractive index between the continuous and disperse phase material is large in the in-plane (x- and y-) directions, and small or zero in the out-of-plane (z-) direction. Thus, light rays traveling at highly oblique angles $\theta_{int}$ within the body of the diffuse reflector, and which are polarized in the plane of incidence (p-polarized), are more strongly transmitted by the diffuse reflector. A structured surface film 60 is shown attached to the first major surface 58a of the reflector 58. The structured surface of film 60 may define linear extending prisms as is common in BEF products, or other prismatic structures. The tilted or angled nature of the facets allow obliquely propagating light rays launched in air to propagate through the body of the reflector 58 at super-critical angles. A conventional secondary diffuser 62 is shown attached to the second major surface 58b of the reflector. The secondary diffuser prevents super-critical propagating light from being trapped by total internal reflection at the second major surface 58b, and it also redirects oblique rays at least partially towards the viewing axis of the display. Of course, it may also redirect some light rays traveling parallel to the viewing axis of the display away from such viewing axis, to oblique angles.

Additional light management films may also be used, depending on the requirements of the application. Such additional film(s), which may include polarizers (including reflective polarizing films), BEF, turning films, diffusing films, and the like, are shown schematically as film 64 in FIG. 4.

We now describe test results that demonstrate the angle-dependent operation of the disclosed birefringent diffuse reflectors.

As a baseline for comparison, several samples of commercially available Vikuiti™ Diffuse Reflective Polarizing Film (DRPF), manufactured by 3M Company, were obtained. These samples all had a continuous/disperse phase construction. The continuous phase material was a miscible blend of 55% PEN and 45% PET, the blend having a refractive index of about 1.61 before orientation. The disperse phase material of the samples was syndiotactic polystyrene (sPS), whose weight average molecular weight is about 200,000, the material being designated by its manufacturer, Dow Chemical Co., as sPS-200-0. Pellets of the materials for the continuous phase and pellets of the material for the disperse phase were heated and mixed, in a proportion of about 58 volume % of the PEN/PET blend and 42 vol % sPS, in a twin screw extruder at about 277 degrees C. The mixture was continuously extruded to form a cast web about 1 millimeter thick, with small particles of the sPS dispersed within the 55/45 PEN/PET blend matrix through the thickness of the web. The cast web was then stretched in a length orienter (along the length of the web, sometimes referred to as the machine direction or MD) by a factor of about 1.35, and then stretched in a tenter (along the width of the web, sometimes referred to as the transverse direction or TD) by a factor of about 5.0. The stretch factors mentioned here refer to the span of a small representative portion of the web along a given direction (whether MD or TD) after stretching divided by the span of that same portion of the web before stretching. Thus, the length orienter stretch factor of 1.35 represents about a 35% increase in the span of the web along the length direction. The length orienter utilized preheat rolls heated to about 98° C., and a quartz lamp for heating the web in the draw gap. The tenter preheated the web to about 138° C. and then stretched it at about 118° C. After stretching, the web was converted or cut into sheets of commercial quality diffuse reflective polarizing film, the sheets having flat major surfaces and a thickness dependent on its processing conditions. A first sample type, referred to as "5 mil DRPF", was processed as just described, and had a thickness of about 00.13 mm (0.005 inch). A second sample type, referred to as "3 mil DRPF", was thinned by increasing the speed of the casting wheel to reduce the cast web thickness to 0.6 mm, and had a finished thickness of about 0.08 mm (0.003 inch). A third sample type, referred to as "2 mil DRPF", was further thinned by increasing the casting wheel speed to reduce the cast web thickness to about 0.4 mm, and had a finished thickness of about 0.05 mm (0.002 inch). The two thinner cast web samples were oriented with the same conditions as the "5 mil DRPF". Three samples from three different crossweb positions of the oriented film were taken of the 5 mil DRPF sample type, and one sample each of the 3 mil DRPF sample type and of the 2 mil DRPF sample type were tested.

Each of these samples is believed to have a similar size distribution of disperse phase material, and similar refractive indices of the disperse phase material and continuous phase material in the finished product. The size distribution has an estimated geometric mean radius for the disperse phase particles of about 70 nanometers, the probability density associated with the distribution having half-peak or 50% points at about 45 nm and 110 nm. Particle shapes included prolate spheroids, oblate spheroids, ellipsoids, and near-spheres. The refractive indices of the continuous and disperse phase materials in the finished products or samples were estimated by using a physical model of the DRPF film and adjusting the refractive indices to provide a good match between modeled performance and observed hemispheric transmission data for various incidence angles and polarizations. The results were as shown in Table 1, where the out-of-plane refractive index difference $\Delta n_z$ was estimated at slightly less than half of the maximum in-plane refractive index difference $\Delta n_x$:

TABLE 1

| | Estimated refractive index for DRPF samples | | |
| --- | --- | --- | --- |
| | Nx | ny | nz |
| 55/45 coPEN | 1.767 | 1.605 | 1.525 |
| sPS | 1.575 | 1.613 | 1.613 |
| Difference | $\Delta n_x = 0.192$ | $\Delta n_y = 0.008$ | $\Delta n_z = 0.088$ |

Each sample was tested using an Oriel Brand diode array spectrophotometer for transmission (or transmissivity, expressed as a percentage) at normal incidence ($\theta=0$ in an air medium), and at 30 degrees incidence ($\theta=30$ degrees in an air medium), and at 60 degrees incidence ($\theta=60$ degrees in an air medium). The spectrophotometer was operated with a diffuse (lambertian) light source and a light collimating detector. This is optically the same as using a collimated incident light beam and an integrating sphere detector. For normal incidence the transmission was measured for light linearly polarized parallel to the block axis of the polarizing film, and for the other measurements the transmission was measured for p-polarized light incident in a plane that was parallel to the block axis of the polarizing film. In each case, the transmission (T) was calculated relative to an identical setup but where the film sample was removed. Hence, the calculated transmission values include contributions due to reflections off of the flat major surfaces of the samples, which were in contact with air. Also, transmission was initially measured over a range of discrete visible wavelengths from 400 to 700 nanometers, and these values were then averaged to provide a single transmission value representative of the whole visible spectrum. The results are as shown in Table 2, where $\Delta T$ is the difference in transmission between normal incidence and 60 degree oblique incidence:

TABLE 2

| Sample type | Sample | T for $\theta = 0°$ | T for $\theta = 30°$ | T for $\theta = 60°$ | $\Delta T$ |
| --- | --- | --- | --- | --- | --- |
| 5 mil DRPF | 1 | 17.1% | 18.5% | 21.2% | 4.1% |
| | 2 | 14.1% | | 18.5% | 4.4% |
| | 3 | 13.3% | | 17.6% | 4.3% |
| 3 mil DRPF | 1 | 17.6% | 18.9% | 20.7% | 3.1% |
| 2 mil DRPF | 1 | 18.3% | 18.8% | 21.5% | 3.2% |

Inspection of Table 2 reveals that although the standard DRPF samples exhibit an increase in transmission $\Delta T$ for p-polarized light between 60 degrees and normal incidence, the increase is very small, and is less than the normal-incidence reflectivity associated with the front major surface of the sample. Hence, the standard DRPF products do not exhibit the desired angle-dependent behavior effective for bulb hiding purposes in a direct-lit backlight.

Some other diffuse polarizing films were then fabricated with other materials and using different processing conditions to provide a much smaller out-of-plane refractive index mismatch between the continuous and disperse phase materials.

In a first sample type, PEN was used as the continuous phase material, and polycarbonate was used as the disperse phase material. Mixed pellets of 0.56 intrinsic viscosity (IV) PEN and Macrolon™ 2458 polycarbonate (available from Bayer corporation) with a weight ratio of 70/30 were fed into a 25 mm twin screw extruder at a rate of 15 lbs/hr and using a screw speed of 200 rpm. The various extruder temperature zones were ramped from 171° C. to 277° C. The remainder of the melt train and extrusion die were held at 285° C. The final melt temperature before entering the 15 cm wide die was measured at 312° C. The melt was cast onto a wheel at 2 cm/sec. The cast wheel was cooled to 60° C. The cast web was later stretched in a Karo IV brand film stretcher from Bruckner corporation. The cast web was preheated at 155° C. for 50 sec and then stretched at that temperature at a rate of 100%/sec. The stretch ratio was 6:1 and the film was allowed to relax in the non-stretch direction in order to achieve a true uniaxial stretch in portions sufficiently distant from the clips. The finished film was a diffuse reflector approximately 0.25 mm thick with flat major surfaces. The average particle size was about 400 nm for the small diameter of elongated particles within the PEN matrix. The finished film was also substantially spatially uniform over the useable area of the film. The refractive indices of the continuous and disperse phase materials in the finished film were estimated to be as shown in Table 3, based on the values of each individual material measured when stretched as a monolithic film under the same conditions. Since this is only an estimate, the values in Table 3 are listed with only 2 significant digits. For this reason, $\Delta n_y$ and $\Delta n_z$ may be as large as 0.01, even though they are listed as 0.0.

TABLE 3

| | Estimated refractive index (at 633 nm) | | |
|---|---|---|---|
| | Nx | ny | nz |
| PEN | 1.82 | 1.58 | 1.58 |
| polycarbonate | 1.58 | 1.58 | 1.58 |
| Difference | Δnx = 0.24 | Δny = 0.00 | Δnz = 0.00 |

Two pieces of this PEN/polycarbonate sample type were tested for transmission in the same way as the DRPF samples mentioned above. The results are given in Table 4:

TABLE 4

| Sample type | Sample | T for θ = 0° | T for θ = 30° | T for θ = 60° | ΔT |
|---|---|---|---|---|---|
| PEN/polycarb | 1 | 8.1% | 12.9% | 22.0% | 13.9% |
| | 2 | 13.3% | 18.8% | 29.5% | 16.2% |

Inspection of Table 4 reveals a much higher increase in transmission ΔT for p-polarized light between 60 degrees and normal incidence compared to the ΔT measured for the DRPF samples. The ΔT for the new samples was much greater than the normal-incidence reflectivity associated with the front major surface of the samples. Hence, the new samples are diffuse reflectors that do exhibit the desired angle-dependent behavior effective for bulb hiding purposes in a direct-lit backlight.

In a second sample type, a 90/10 copolymer (coPEN) of PEN and PET was used as the continuous phase material, and Makroblend™ DP4-1386 from Bayer (a 50/50 blend of polycarbonate and PET) was used as the disperse phase material. Mixed pellets of these materials with a weight ratio of 50/50 were fed into a 25 mm twin screw extruder at a rate of 15 lbs/hr and using a screw speed of 200 rpm. The various extruder temperature zones were ramped from 171° C. to 277° C. The remainder of the melt train and extrusion die were held at 285° C. The final melt temperature before entering the 15 cm wide die was measured at 307° C. The melt was cast onto a wheel at 2.8 cm/sec. The cast wheel was cooled to 60° C. The cast web was later stretched in a Karo IV brand film stretcher from Bruckner corporation. The cast web was preheated at 145° C. for 50 sec and then stretched at that temperature at a rate of 100%/sec. The stretch ratio was 6:1 and the film was allowed to relax in the non-stretch direction in order to achieve a true uniaxial stretch in portions sufficiently distant from the clips. The finished film was a diffuse reflector approximately 0.18 mm thick with flat major surfaces. The finished film was also substantially spatially uniform over the useable area of the film. The refractive indices of the continuous and disperse phase materials in the finished film were estimated to be as shown in Table 5, based on the values of each individual material measured when stretched as a monolithic film under the same conditions. Since this is only an estimate, the values in Table 5 are listed with only 2 significant digits. For this reason, Δny and Δnz may differ as much as 0.01 from the values that are listed.

TABLE 5

| | Estimated refractive index (at 633 nm) | | |
|---|---|---|---|
| | Nx | Ny | nz |
| 90/10 coPEN | 1.82 | 1.57 | 1.57 |
| polycarbonate | 1.58 | 1.58 | 1.58 |

TABLE 5-continued

| | Estimated refractive index (at 633 nm) | | |
|---|---|---|---|
| | Nx | Ny | nz |
| Difference | Δnx = 0.24 | Δny = 0.01 | Δnz = 0.01 |

One piece of this 90/10 coPEN/polycarbonate sample type was tested for transmission in the same way as the other samples mentioned above. The results are given in Table 6:

TABLE 6

| Sample type | Sample | T for θ = 0° | T for θ = 30° | T for θ = 60° | ΔT |
|---|---|---|---|---|---|
| 90/10coPEN/polycarb | 1 | 19.0% | 23.6% | 32.6% | 13.7% |

Inspection of Table 6 again reveals a substantially higher increase in transmission ΔT for p-polarized light between 60 degrees and normal incidence compared to the ΔT measured for the DRPF samples. The ΔT for the new sample was much greater than the normal-incidence reflectivity associated with the front major surface of the samples. Hence, the new sample is a diffuse reflector that does exhibit the desired angle-dependent behavior effective for bulb hiding purposes in a direct-lit backlight.

Unless otherwise indicated, all numbers expressing quantities, measurement of properties and so forth used in the specification and claims are to be understood as being modified in all instances by the term "about." Accordingly, unless indicated to the contrary, the numerical parameters set forth in the specification and claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The foregoing description is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention. All patents and patent applications referred to herein are incorporated by reference in their entireties, except to the extent they are contradictory to the foregoing specification.

The invention claimed is:
1. A direct-lit backlight, comprising:
  a light source; and
  a diffuse reflector disposed in front of the light source, and having a continuous phase material and a disperse phase material, at least one of which is birefringent, and whose refractive indices are tailored to provide the diffuse reflector with a transmissivity that increases substantially with increasing incidence angle from normal incidence.

2. The backlight of claim 1, wherein the disperse phase material is in the form of particles whose average transverse dimension is less than 1 micrometer.

3. The backlight of claim 1, wherein the diffuse reflector is spatially uniform.

4. The backlight of claim 1, wherein the transmissivity of the diffuse reflector differs for obliquely incident light relative to normally incident light by an amount $\Delta T$, and $\Delta T$ exceeds the combined reflectivity at normal incidence of opposed major surfaces of the diffuse reflector.

5. The backlight of claim 4, wherein the obliquely incident light is p-polarized and is incident at a 60 degree angle in air.

6. The backlight of claim 1, wherein the transmissivity of the diffuse reflector differs for obliquely incident light relative to normally incident light by an amount $\Delta T$ of at least 10%, and wherein the obliquely incident light is incident at a 60 degree angle in air.

7. The backlight of claim 6, wherein $\Delta T$ is at least 15%.

8. The backlight of claim 1, wherein the continuous and disperse phases exhibit a relative refractive index mismatch $\Delta nx$ along an in-plane x-direction and a relative refractive index mismatch $\Delta nz$ along an out-of-plane z-direction normal to the x-direction, $\Delta nz$ being substantially smaller in magnitude than $\Delta nx$.

9. The backlight of claim 1, wherein the disperse phase material is substantially isotropic and the continuous phase material is birefringent.

10. The backlight of claim 1, wherein the diffuse reflector is a diffuse reflective polarizer.

11. The backlight of claim 10, further comprising a second reflective polarizer disposed in front of the light source.

12. The backlight of claim 11, wherein the second reflective polarizer is disposed in front of the diffuse reflective polarizer, and a block axis of the second reflective polarizer is aligned with a pass axis of the diffuse reflective polarizer.

13. The backlight of claim 1, wherein the diffuse reflector is a diffuse reflective mirror.

14. The backlight of claim 1, wherein the diffuse reflector has opposed major surfaces, the backlight further comprising a structured surface material coupled to at least one major surface to support super-critical light propagation in the diffuse reflector.

15. The backlight of claim 1, further including:
a back reflector disposed behind the light source.

16. The backlight of claim 1, further comprising:
a secondary diffuser disposed in front of the diffuse reflector.

17. The backlight of claim 1, wherein the light source is selected from one or more fluorescent lamps and one or more light emitting diodes (LEDs).

18. The backlight of claim 1, wherein the diffuse reflector is spaced apart from the light source by a gap.

19. A combination of optical films suitable for use in a direct-lit backlight, the combination comprising:
a diffuse reflective polarizer having a continuous phase material and a disperse phase material, at least one of which is birefringent, and whose refractive indices are tailored to provide the diffuse reflective polarizer with a transmissivity along a block axis thereof that increases substantially with increasing incidence angle from normal incidence; and
a second polarizer having a block axis and a pass axis, the second polarizer being oriented such that the pass axis of the second polarizer is aligned with the block axis of the diffuse reflective polarizer.

20. The combination of claim 19, wherein the diffuse reflective polarizer and the second polarizer are substantially co-extensive in length and width.

21. The combination of claim 19, wherein the diffuse reflective polarizer and the second polarizer are laminated together.

* * * * *

UNITED STATES PATENT AND TRADEMARK OFFICE
CERTIFICATE OF CORRECTION

PATENT NO. : 8,007,118 B2  
APPLICATION NO. : 11/843178  
DATED : August 30, 2011  
INVENTOR(S) : Mark Brian O'Neill Page 1 of 1

It is certified that error appears in the above-identified patent and that said Letters Patent is hereby corrected as shown below:

On the title page, item [74],
Column 2, Line 1, Delete "Moshrefzaden" and insert -- Moshrefzadeh --, therefor.

Column 1,
Line 62, Delete "2 R)." and insert -- 2R). --, therefor.

Signed and Sealed this
Seventeenth Day of January, 2012

David J. Kappos
*Director of the United States Patent and Trademark Office*